(12) United States Patent
Cook

(10) Patent No.: US 11,957,116 B2
(45) Date of Patent: Apr. 16, 2024

(54) ANIMAL WATERING DEVICE

(71) Applicant: Mindy M. Cook, Paris, KY (US)

(72) Inventor: Mindy M. Cook, Paris, KY (US)

(*) Notice: Subject to any disclaimer, the term of this patent is extended or adjusted under 35 U.S.C. 154(b) by 10 days.

(21) Appl. No.: 17/487,207

(22) Filed: Sep. 28, 2021

(65) Prior Publication Data

US 2022/0104456 A1 Apr. 7, 2022

Related U.S. Application Data

(60) Provisional application No. 63/086,234, filed on Oct. 1, 2020.

(51) Int. Cl.
*A01K 7/02* (2006.01)

(52) U.S. Cl.
CPC ............ *A01K 7/027* (2013.01); *A01K 7/02* (2013.01)

(58) Field of Classification Search
CPC ............ A01K 7/00; A01K 7/02; A01K 7/027
USPC ..................................................... 119/72, 73
See application file for complete search history.

(56) References Cited

U.S. PATENT DOCUMENTS

| | | | | |
|---|---|---|---|---|
| 1,839,595 A * | 1/1932 | Ritchie | ............... | A01K 7/04 119/73 |
| 4,584,966 A * | 4/1986 | Moore | ............... | A01K 7/00 137/236.1 |
| 4,646,687 A * | 3/1987 | Peterson | ............... | A01K 7/02 119/73 |
| 4,704,991 A * | 11/1987 | Moore | ............... | A01K 7/027 119/73 |
| 4,856,459 A * | 8/1989 | Wiseman | ............... | A01K 7/027 119/73 |
| 5,452,683 A * | 9/1995 | Poffenroth | ............... | A01K 7/027 119/73 |
| 5,474,029 A * | 12/1995 | Hofer | ............... | A01K 7/027 119/73 |
| 5,636,595 A * | 6/1997 | Lunde | ............... | A01K 63/04 119/224 |
| 5,740,760 A * | 4/1998 | Winebrenner | ............... | A01K 7/027 119/73 |
| 6,619,232 B2 * | 9/2003 | Johnston | ............... | A01K 7/027 119/73 |
| 6,651,588 B1 * | 11/2003 | Penzimer | ............... | A01K 13/001 119/665 |
| 6,729,264 B2 * | 5/2004 | Duenow | ............... | A01K 7/06 119/73 |
| 7,423,243 B2 * | 9/2008 | Reusche | ............... | A01K 1/0158 219/494 |
| 7,823,538 B1 * | 11/2010 | Merager | ............... | A01K 7/02 119/72 |
| 2016/0174522 A1 * | 6/2016 | Colica | ............... | G05D 9/12 119/73 |

* cited by examiner

*Primary Examiner* — David J Parsley
(74) *Attorney, Agent, or Firm* — Frost Brown Todd LLP

(57) ABSTRACT

An animal watering device is provided that is automatically fillable for providing water to animals, such as horses or other livestock. Animal watering device includes a base, a trough positioned within the base for storing water, and a water filling assembly coupled with the trough to control a water level within the trough. A ring can be positioned about an upper surface of the trough to protect the upper surface of the trough. A disc can be positioned within the trough to cover a portion of water filling assembly positioned within the trough, while allowing water to flow through the disc.

19 Claims, 4 Drawing Sheets

ANIMAL WATERING DEVICE

PRIORITY

This application claims priority to U.S. Provisional Application Ser. No. 63/086,234, filed Oct. 1, 2020, entitled "ANIMAL WATERING DEVICE," the disclosure of which is incorporated herein by reference.

BACKGROUND

The present disclosure relates to an animal watering device for providing water to animals such as horses or other livestock. A typical animal watering device automatically refills a base with water from a pressurized line. While a variety of animal watering devices have been made and used, it is believed that no one prior to the inventor(s) has made or used an invention as described herein.

BRIEF DESCRIPTION OF THE DRAWINGS

The accompanying drawings illustrate embodiments which serve to explain the principles of the present innovation.

Figure 1:
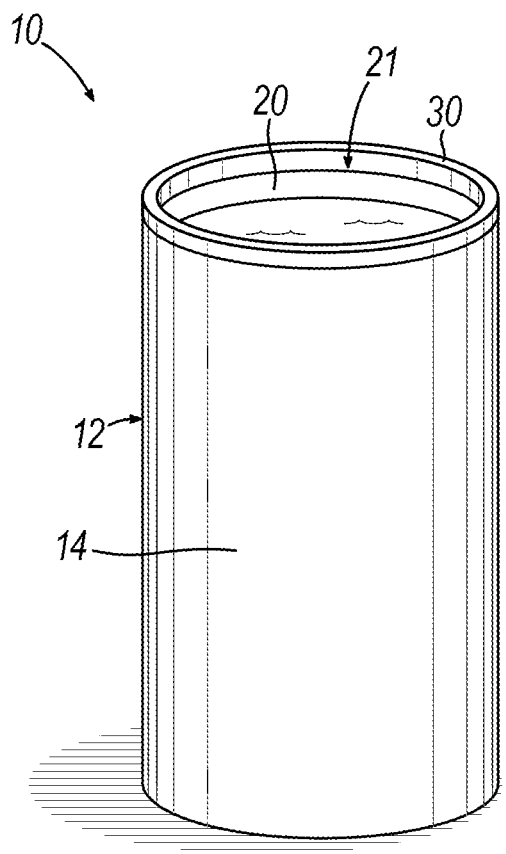
FIG. 1 is a perspective view of an exemplary animal watering device.

The drawings are not intended to be limiting in any way, and it is contemplated that various embodiments of the innovation may be carried out in a variety of other ways, including those not necessarily depicted in the drawings. The accompanying drawings incorporated in and forming a part of the specification illustrate several aspects of the present innovation, and together with the description serve to explain the principles of the innovation; it being understood, however, that this innovation is not limited to the precise arrangements shown.

DETAILED DESCRIPTION

The following description of certain examples of the innovation should not be used to limit the scope of the present innovation. Other examples, features, aspects, embodiments, and advantages of the innovation will become apparent to those skilled in the art from the following description, which is by way of illustration, one of the best modes contemplated for carrying out the innovation. As will be realized, the innovation is capable of other different and obvious aspects, all without departing from the innovation. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

The word "exemplary" is used herein to mean "serving as an example, instance, or illustration." Any implementation described herein as "exemplary" is not necessarily to be construed as preferred or advantageous over other implementations.

Figure 2:
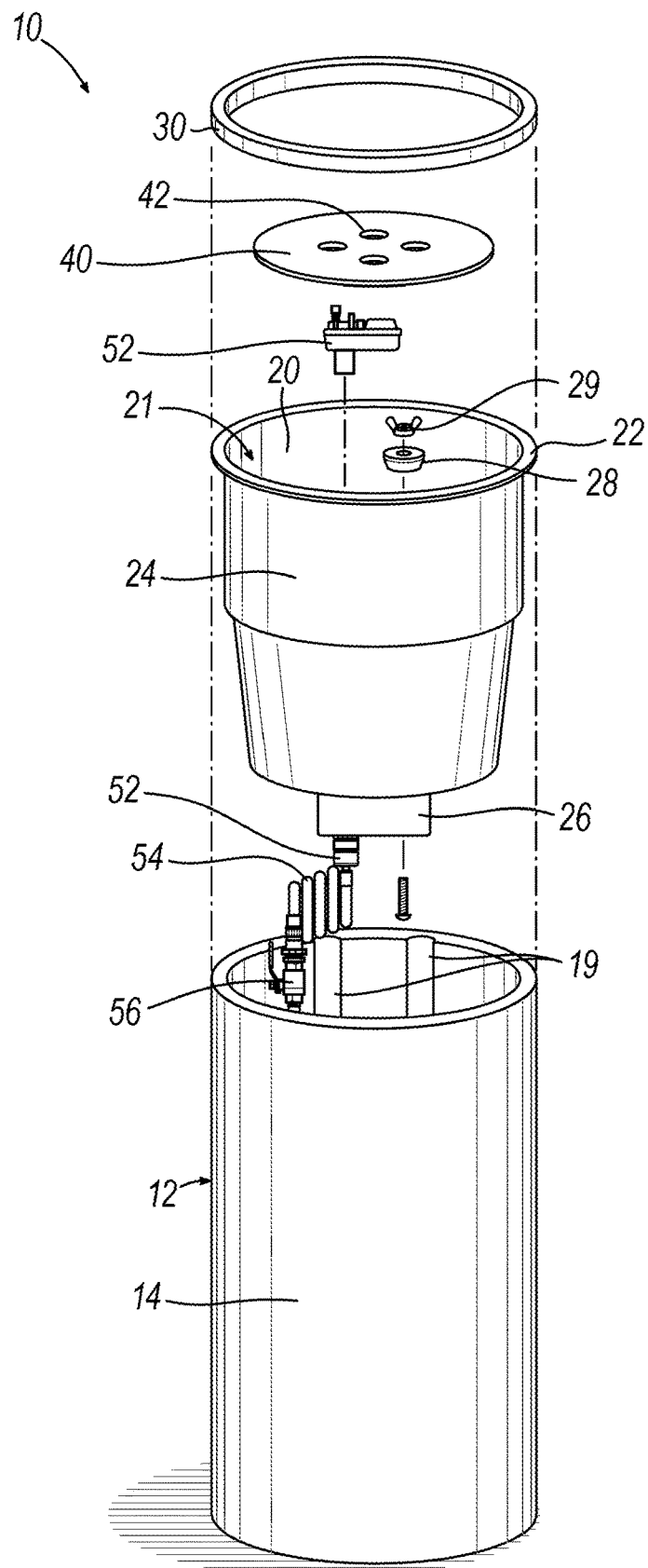
FIG. 2 is an exploded view of the animal watering device of FIG. 1.
Figure 3:
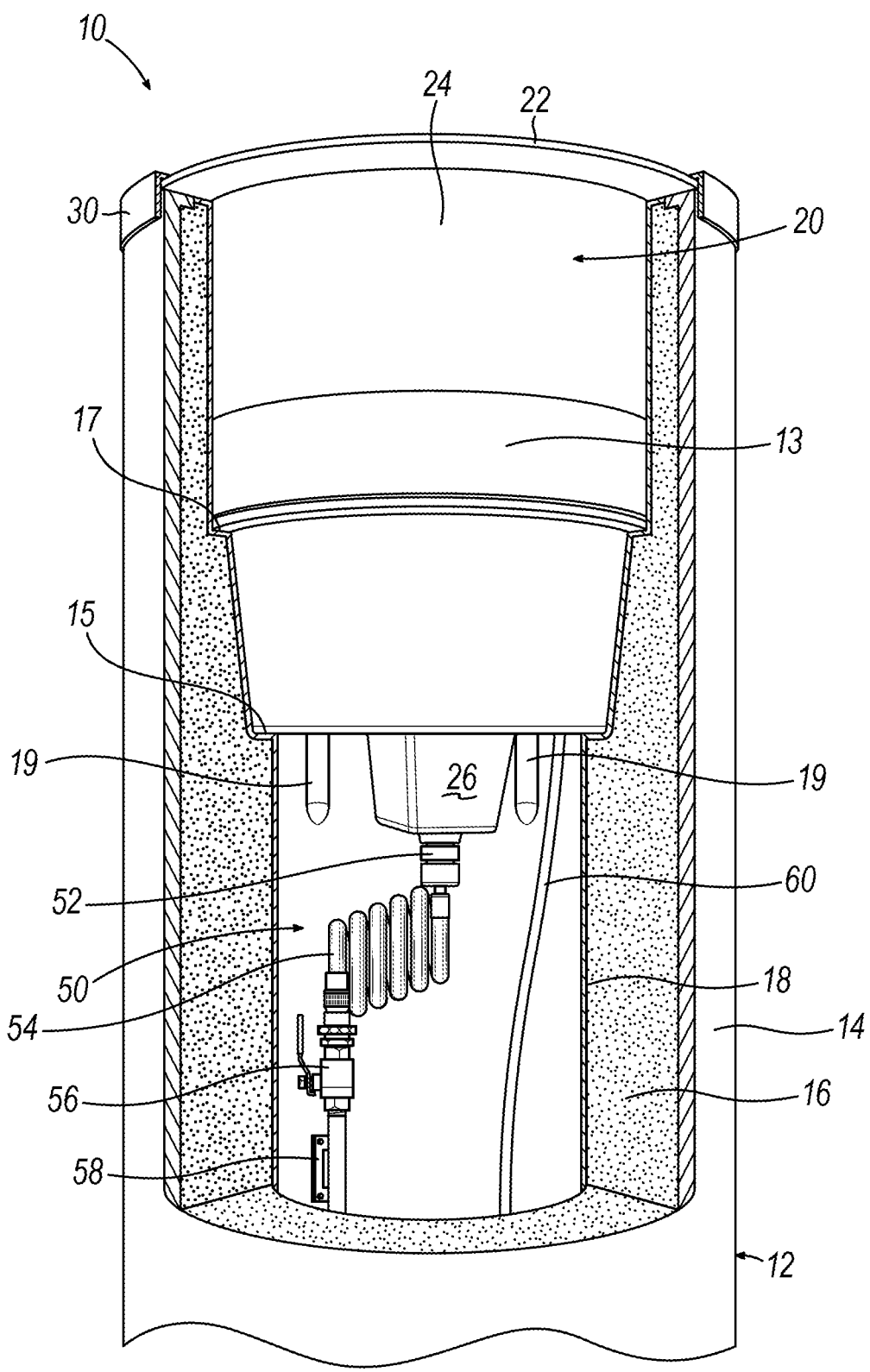
FIG. 3 is a side elevational view of the animal watering device of FIG. 1 with a portion of a base omitted for illustrative purposes.
Figure 4:
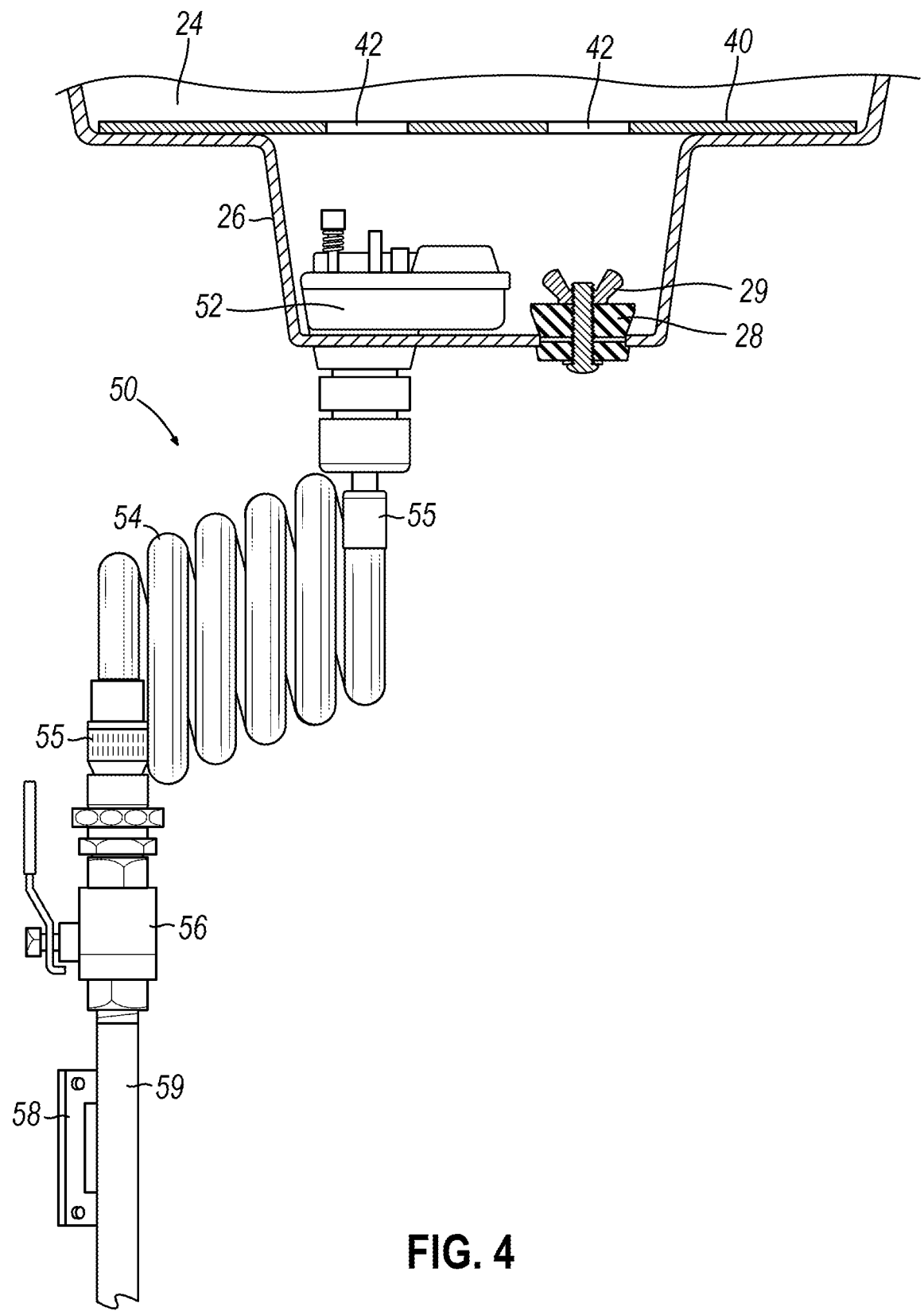
FIG. 4 is a partial cross-sectional view of the animal watering device of FIG. 1 with the base omitted for illustrative purposes.

FIGS. 1-4 show an exemplary animal watering device 10 for providing drinking water to animals, such as horses or other livestock, that automatically refills with water. Animal watering device 10 comprises a base 12, a trough 20, and a water filling assembly 50. Base 12 comprises an outer wall 14, an inner wall 18, and insulation 16 positioned between outer and inner walls 14, 18 that is configured to insulate the water stored within watering device 10 from outdoor temperatures. A plurality of recesses 19 are shown extending within inner wall 18 that may be configured to allow for airflow about trough 20 positioned within base 12, but recesses 19 are merely optional. Base 12 further comprises a lower shelf 15 and an upper shelf 17 that are configured to support trough 20 within base 12. A heating device 13 is further shown in the illustrated version at upper shelf 17 that may be configured to heat the water stored within watering device 10. Heating device 13 can be coupled to a power source (not shown) via cable 60. In some versions, heating device 13 may include a heat ring and/or tape. Heating device 13 may have a power of about 200 watts. Still other suitable configurations for heating device 13 will be apparent to one with ordinary skill in the art in view of the teachings herein. Further, heating device 13 is optional such that heating device 13 may be omitted in some versions.

Trough 20 comprises a body 24 defining a cavity 21 within for storing water, a flange 22 extending outwardly about a top portion of body 24, and a housing 26 extending underneath body 24 configured to store a portion of water filling assembly 50. Cavity 21 is sufficiently sized to allow an animal to access the water stored within cavity 21 for drinking. Housing 26 includes a stopper 28 selectively insertable through an opening of housing 26 such that stopper 28 can be removed to easily drain and/or clean trough 20. Stopper 28 can be made from rubber or other suitable material for sealing the opening of housing 26. Stopper 28 of the illustrated version includes a fastener 29, such as a wing nut, that can be selectively tightened and/or loosened relative to stopper 28 to thereby tighten and/or loosen stopper 28 within housing 26. Still other suitable configurations for sealing and/or draining trough 20 will be apparent to one with ordinary skill in the art in view of the teachings herein.

A ring 30 is positioned on flange 22 about a circumference of the top portion of body 24. Ring 30 can be made from stainless steel or other suitable material to inhibit an animal from chewing on and/or damaging trough 20. A disc 40 is positioned within trough 20 between body 24 and housing 26. Disc 40 includes one or more openings 42 extending therethrough that are configured to allow water to flow through the one or more openings 42. Disc 40 can be made from stainless steel or other suitable material to inhibit an animal from inserting its tongue or other body part within housing 26 near a portion of water filling assembly 50 for increased safety of the animal.

Water filling assembly 50 comprises a fill valve 52, a hose 54, a shut-off valve 56, and a support 58. Fill valve 52 is positioned through housing 26 of trough 20 such that fill valve 52 extends through a bottom portion of trough 20. Fill valve 52 is configured to maintain or control a water level within cavity 21 of trough 20 and/or to refill cavity 21 with water. An example of a fill valve is a Free Flo valve manufactured by Freeland Industries, Inc. of Portage, Wisconsin Hose 54 is configured to fluidly couple fill valve 52 with shut-off valve 56. Each end of hose 54 includes a coupling 55 for coupling hose 54 with valves 52, 56. Coupling 55 can be made from brass or other suitable material that is threaded to allow hose 54 to be threadably coupled with each valve 52, 56. Hose 54 may be a coiled hose having a diameter of about ½ inch, though other suitable dimensions can be used to allow water to flow between fill valve 52 and shut-off valve 56.

Shut-off valve 56 is configured to selectively couple a water supply (not shown) with watering device 10 and is mounted on inner wall 18 of base 12 of the illustrated version by support bracket 58. Accordingly, when shut-off valve 56 is positioned in an open configuration, shut-off valve 56 allows water to flow from the water supply through hose 54 to fill valve 52. When shut-off valve 56 is positioned in a closed configuration, shut-off valve 56 inhibits water from flowing through hose 54 to fill valve 52. Shut-off valve 56 can be a stainless-steel ball valve having a diameter of about ½ inch to correspond to hose 54. Shut-off valve 56 of the illustrated version is mounted with a stainless-steel pipe nipple that can be removed if repairs are needed. Shut-off valve 56 is then couplable with a water supply (not shown) via a water supply line 59. Supply line 59 can be a stainless-steel braided water supply line, though other suitable configurations can be used.

In use, shut-off valve 56 can be positioned in the open configuration to allow water to flow from water supply line 59, through hose 54, to fill valve 52. Fill valve 52 can then fill cavity 21 of trough 20 with a select amount of water. An animal can then drink the water stored within cavity 21 of trough 20. If the water level within cavity 21 decreases, fill valve 52 can operate to automatically fill cavity 21 with water to maintain the select water level. If watering device 10 needs to be cleaned and/or repaired, shut-off valve 56 can be moved to the closed configuration to inhibit water from flowing to trough 20. Stopper 28 can be removed from housing 26 to allow water to drain from trough 20. Animal watering device 10 thereby allows for easy cleaning and/or repair of animal watering device 10.

EXAMPLES

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An animal watering device comprising: a base; a trough positioned within the base, wherein the trough is configured to store water; a water filling assembly coupled with the trough such that a portion of water filling assembly is positioned within the trough, wherein the water filling assembly is configured to control a water level within the trough; a ring positioned about an upper surface of the trough, wherein the ring is configured to protect the upper surface of the trough; and a disc positioned within the trough to cover the portion of water filling assembly positioned within the trough, wherein the disc includes one or more openings to allow water to flow through the disc.

Example 2

The animal watering device of Example 1, wherein the base comprises an outer wall and an inner wall extending longitudinally through the outer wall, wherein the inner wall is configured to receive the trough.

Example 3

The animal watering device of Example 2, wherein the base further comprises insulation positioned between the outer wall and the inner wall configured to insulate the water stored within the trough.

Example 4

The animal watering device of any one or more of Examples 2 through 3, wherein the inner wall includes a plurality of recesses extending within the inner wall that are configured to allow air to flow about the trough.

Example 5

The animal watering device of any one or more of Examples 2 through 4, wherein the inner wall comprises a shelf configured receive a surface of the trough to support the trough within the base.

Example 6

The animal watering device of any one or more of Examples 1 through 5, further comprising a heating device configured to heat the water stored within the trough.

Example 7

The animal watering device of Example 6, wherein the heating device includes a ring positioned about the trough.

Example 8

The animal watering device of any one or more of Examples 1 through 7, wherein the trough includes a flange extending outwardly about a top portion of the trough, wherein the ring is positioned about the flange.

Example 9

The animal watering device of any one or more of Examples 1 through 8, wherein the trough comprises a housing positioned below the disc, wherein the housing is configured to house a portion of the water filling assembly.

Example 10

The animal watering device of Example 9, wherein the housing includes a stopper selectively insertable through an opening of the housing, wherein the stopper includes an actuator configured to adjust the tightness of the stopper within the opening.

Example 11

The animal watering device of any one or more of Examples 9 through 10, wherein the water filling assembly comprises a fill valve configured to control a level of the water stored within the trough, wherein at least a portion of the fill valve is positioned within the housing.

Example 12

The animal watering device of any one or more of Examples 1 through 11, wherein the water filling assembly comprises: a fill valve configured to control a level of the water stored within the trough, a shut-off valve fluidly couplable with a water supply, and a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position.

Example 13

The animal watering device of Example 12, wherein the hose includes a coupling positioned at each end of the hose, wherein each coupling is threadably couplable with a select one or both of the fill valve and the shut-off valve.

Example 14

The animal watering device of any one or more of Examples 12 through 13, wherein the shut-off valve is coupled to an inner wall of the base by a support bracket.

Example 15

The animal watering device of any one or more of Examples 12 through 14, wherein the shut-off valve includes a stainless-steel ball valve.

Example 16

An animal watering device comprising: a base; a trough positioned within the base, wherein the trough is configured to store water; a water filling assembly coupled with the trough such that a portion of water filling assembly is positioned within the trough, wherein the water filling assembly comprises: a fill valve configured to control a level of the water stored within the trough, a shut-off valve fluidly couplable with a water supply, and a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position; a ring positioned about an upper surface of the trough; and a disc positioned within the trough to cover the portion of water filling assembly positioned within the trough, wherein the disc includes one or more openings to allow water to flow through the disc.

Example 17

An animal watering device comprising: a base; a trough positioned within the base, wherein the trough is configured to store water; a water filling assembly coupled with the trough, wherein the water filling assembly comprises: a fill valve configured to control a level of the water stored within the trough, a shut-off valve fluidly couplable with a water supply, wherein the shut-off valve is coupled with an inner wall of the base by a support bracket, and a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position.

Example 18

The animal watering device of Example 17 further comprising a ring positioned about an upper surface of the trough.

Example 19

The animal watering device of any one or more of Examples 17 through 18 further comprising a disc positioned within the trough to cover the portion of water filling assembly positioned within the trough, wherein the disc includes one or more openings to allow water to flow through the disc.

Example 20

The animal watering device of any one or more of Examples 17 through 19, wherein the trough includes a stopper selectively insertable through an opening of the trough, wherein the stopper includes an actuator configured to adjust the tightness of the stopper within the opening.

Having shown and described various embodiments of the present innovation, further adaptations of the methods and systems described herein may be accomplished by appropriate modifications by one of ordinary skill in the art without departing from the scope of the present innovation. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present innovation should be considered in terms of the following claims and is understood not to be limited to the details of structure and operation shown and described in the specification and drawings.

I claim:
1. An animal watering device comprising:
a base;

a trough positioned within the base, wherein the trough is configured to store water and includes a body and a housing, wherein the body is positioned above the housing, wherein the housing includes a perimeter, wherein the body includes a lip;

a water filling assembly coupled with the trough such that a portion of water filling assembly is positioned within the housing, wherein the water filling assembly is configured to control a water level within the body;

a heating device positioned along the body of the trough and above the lip, wherein the heating device is configured to heat a portion of the trough;

a ring positioned about an upper surface of the trough, wherein the ring is configured to protect the upper surface of the trough; and a disc positioned within the trough to cover the portion of water filling assembly positioned within the housing, wherein the disc is configured to separate the body from the housing of the trough by spanning beyond an entirety of the perimeter, wherein the disc includes one or more openings to allow water to flow through the disc, wherein the lip is above the disc.

2. The animal watering device of claim 1, wherein the base comprises an outer wall and an inner wall extending longitudinally through the outer wall, wherein the inner wall is configured to receive the trough.

3. The animal watering device of claim 2, wherein the base further comprises insulation positioned between the outer wall and the inner wall configured to insulate the water stored within the trough.

4. The animal watering device of claim 2, wherein the inner wall includes a plurality of recesses extending within the inner wall that are configured to allow air to flow about the trough.

5. The animal watering device of claim 2, wherein the inner wall comprises a shelf configured receive a surface of the trough to support the trough within the base.

6. The animal watering device of claim 1, wherein the heating device is less than or equal to 200 watts.

7. The animal watering device of claim 6, wherein the heating device includes a cable extending upwards beyond the housing towards the lip.

8. The animal watering device of claim 1, wherein the trough includes a flange extending outwardly about a top portion of the trough, wherein the ring is positioned about the flange.

9. The animal watering device of claim 1, wherein the housing includes a stopper selectively insertable through an opening of the housing, wherein the stopper includes an actuator configured to adjust the tightness of the stopper within the opening.

10. The animal watering device of claim 1, wherein the water filling assembly comprises a fill valve configured to control a level of the water stored within the trough, wherein at least a portion of the fill valve is positioned within the housing.

11. The animal watering device of claim 1, wherein the water filling assembly comprises:

a fill valve configured to control a level of the water stored within the trough, a shut-off valve fluidly couplable with a water supply, and a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position.

12. The animal watering device of claim 11, wherein the hose includes a coupling positioned at each end of the hose, wherein each coupling is threadably couplable with a select one or both of the fill valve and the shut-off valve.

13. The animal watering device of claim 11, wherein the shut-off valve is coupled to an inner wall of the base by a support bracket.

14. The animal watering device of claim 11, wherein the shut-off valve includes a stainless-steel ball valve.

15. The animal watering device of claim 9, wherein the housing is configured to access the actuator through the housing.

16. An animal watering device comprising:

a base including an inner wall and a plurality of recesses along the inner wall, wherein each recess defines a respective channel within the inner wall;

a trough positioned within the base and including an upper flange, wherein the trough is configured to store water, wherein the plurality of recesses and respective channels extend downwards from the flange of the trough to below the trough and are each configured to provide airflow about the trough, wherein each channel separately extends into a cavity positioned below the trough to thereby allow airflow between the cavity and each channel;

a water filling assembly coupled with the trough such that a portion of water filling assembly is positioned within the trough, wherein the water filling assembly comprises:

a fill valve configured to control a level of the water stored within the trough, a shut-off valve fluidly couplable with a water supply, and a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position;

a ring positioned about an upper surface of the trough; and a disc positioned within the trough to cover the portion of water filling assembly positioned within the trough, wherein the disc includes one or more openings to allow water to flow through the disc.

17. An animal watering device comprising:

a base including a tubular shape having a plurality of vertical channels along an inner sidewall, wherein each vertical channel is configured to allow airflow between a lower and an upper portion of the base, wherein each vertical channel extends to an upper edge of the base to thereby allow airflow to the upper edge of the base;

a trough positioned within the base and including a bottom surface, wherein the trough is configured to store water and includes a drain at the bottom surface, wherein the drain is configured to selectively transition between an open configuration and a closed configuration, wherein the open configuration is configured to drain water out of the trough and into the base and to be transitioned to the open configuration from inside the trough, wherein the closed configuration is configured to retain the water inside the trough, wherein the drain includes a stopper which spans and seals against the bottom surface;

a water filling assembly coupled with the trough, wherein the water filling assembly comprises:
- a fill valve configured to control a level of the water stored within the trough,
- a shut-off valve fluidly couplable with a water supply, wherein the shut-off valve is coupled with an inner wall of the base by a support bracket, and
- a hose fluidly coupling the fill valve with the shut-off valve, wherein the shut-off valve is configured to selectively couple the water supply with the fill valve, wherein the shut-off valve is configured to allow water to flow through the shut-off valve when the shut-off valve is in an open position, wherein the shut-off valve is configured to inhibit water to flow through the shut-off valve when the shut-off valve is in a closed position.

18. The animal watering device of claim 17 further comprising a ring positioned about an upper surface of the trough.

19. The animal watering device of claim 17 further comprising a disc positioned within the trough to cover the portion of water filling assembly positioned within the trough, wherein the disc includes one or more openings to allow water to flow through the disc.

* * * * *